H. BORSTAD.
BERRY GATHERING APPARATUS.
APPLICATION FILED MAY 3, 1918.

1,276,320.

Patented Aug. 20, 1918.

Inventor
Hans Borstad,
By Henry Orth Jr. atty.

UNITED STATES PATENT OFFICE.

HANS BORSTAD, OF CHRISTIANIA, NORWAY.

BERRY-GATHERING APPARATUS.

1,276,320.  Specification of Letters Patent.  Patented Aug. 20, 1918.

Application filed May 3, 1918. Serial No. 232,282.

*To all whom it may concern:*

Be it known that I, HANS BORSTAD, a subject of the King of Norway, residing at Christiania, in the Kingdom of Norway, have invented certain new and useful Improvements in Berry-Gathering Apparatus; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In the apparatus hitherto used for gathering wild berries as bilberries and whortleberries the teeth or prongs are liable to damage the berries and plants by pressing the twigs carrying the berries against each other.

The object of my invention is to provide a berry picking apparatus in which the teeth or prongs are arranged in such a way as to provide sufficiently great distance between the teeth intervals to prevent the crushing of the berries on the individual twigs against each other, and at the same time be able to yield elastically to the pressure of the twigs, thereby avoiding damaging the same.

This is obtained by forming each individual tooth or prong of parallel or substantially parallel wires, rods or strings united at the front end to a point or tip, said wires or strings being spaced in such manner that the twigs in one tooth interval cannot damage the twigs in the adjacent tooth intervals.

Figure 1:
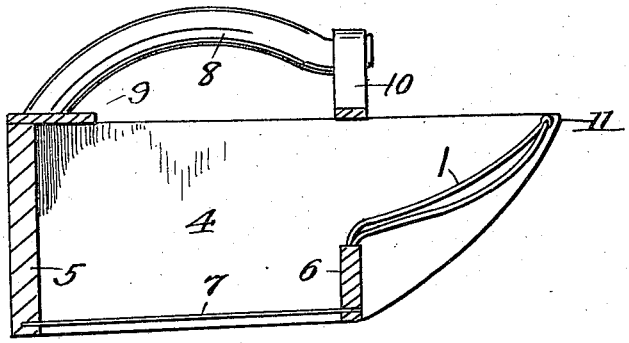
Figure 2:
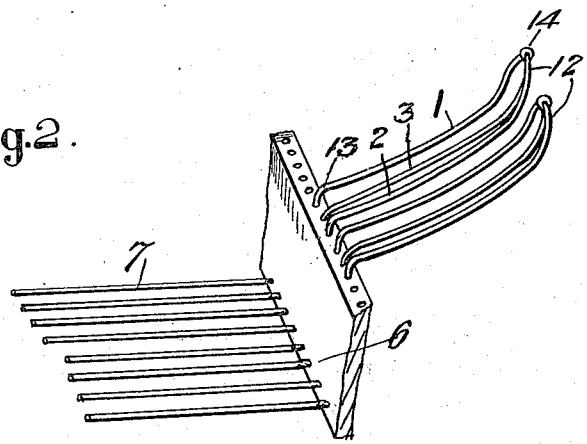

A preferred form of an apparatus according to my invention is shown in the accompanying drawing, Figure 1 being a sectional view of the same, and Fig. 2 showing some teeth or prongs in detail.

As will be seen, each individual tooth or prong is formed by three wires, rods or threads, 1, 2 and 3, of which two (1 and 2) are placed in the same plane, while the third (3) is situated in a somewhat lower plane and forms the bottom of a chute or trough formed by the three wires or rods and serving as a guide for the detached berries to the magazine to which the teeth are attached.

The magazine or receptacle comprises two parallel side members 4 connected by a back piece 5 of the same height as the sides and by a shorter front piece 6. Mounted in the opposing faces of the back and front pieces 5 and 6, near the lower edges thereof, are a plurality of wires or rods 7 arranged parallel to the side members and spaced apart forming a sieve to permit dirt and leaves to sift through.

A handle 8 extends longitudinally of the reservoir and is mounted centrally of two cross pieces 9, 10; the piece 9 forming a short cover or flange at the top of the back piece while the piece 10, which is preferably arched, forms a brace for the sides above the shorter front piece 6, leaving an opening above the latter.

The lower edges of the sides curve upward from in front of the piece 6 forming pointed front ends 11 to the sides, and the teeth extend from the top of the front piece 6 forward and upward into the plane of the pointed ends. The wires 1, 2, form loops having parallel sides, and rounded front ends 12; the inner ends 13 are bent at about right angles to impart elasticity to the sides and to form suitable means to permit mounting the loop in holes in the upper edges of said front piece 6. The wires 1, 2, are extremely flexible so that they will readily yield laterally, when brought into contact with the branches, to avoid injury to the latter. To maintain the pointed ends of the teeth in position, the rods or wires 3 are sufficiently rigid to support the loops. The rods are rigidly mounted in front piece 6 between the ends 13 of the wires 1, 2, and are centrally connected to the rounded front ends of the loops by eyes 14 formed in their outer ends. As stated above, the rods 3 are situated in a lower plane than the loops owing to the bent ends of the latter, so that the three members of each tooth form a chute adapted to guide the berries into the magazine.

The teeth or prongs of the character above described may be used in connection with berry gathering apparatus of any suitable form.

I claim:

1. A berry gathering apparatus, comprising a receptacle, and a plurality of teeth carried thereby each consisting of yielding side members and a rigid member adapted to hold the latter in operative position.

2. A berry gathering apparatus, comprising a receptacle, and a plurality of teeth carried thereby, each tooth consisting of two flexible substantially parallel side wires having their inner ends fixed in the receptacle, and a centrally rigid wire fixed to the receptacle and connected to the outer free ends of the flexible side wires and adapted to support the latter in operative position.

3. A berry gathering apparatus, comprising a receptacle, and a plurality of teeth mounted on the front portion thereof, each tooth consisting of a loop of flexible wire having bent inner ends and a rigid rod having its inner end fixed to the receptacle and its outer end connected to the free end of the loop.

4. A berry gathering apparatus comprising a receptacle having parallel pointed sides, a back connecting the sides, a front member connecting the sides lower than the latter, parallel bottom rods mounted in the back and front members, a plurality of teeth each consisting of a loop formed of flexible wires having bent inner ends mounted in the top of the front member, and a rigid supporting rod having one end fixed in the latter between the inner end of the loop and having its other end secured to the free end of the loop.

In testimony that I claim the foregoing as my invention, I have signed my name in presence of two subscribing witnesses.

HANS BORSTAD.

Witnesses:
C. NORMAN,
C. FABRICIUS HANSEN.

Copies of this patent may be obtained for five cents each, by addressing the "Commissioner of Patents, Washington, D. C."